(12) United States Patent
Zhou

(10) Patent No.: US 7,809,188 B1
(45) Date of Patent: Oct. 5, 2010

(54) DIGITAL CAMERA AND METHOD

(75) Inventor: Jianping Zhou, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 785 days.

(21) Appl. No.: 11/741,753

(22) Filed: Apr. 29, 2007

Related U.S. Application Data

(60) Provisional application No. 60/747,033, filed on May 11, 2006, provisional application No. 60/803,904, filed on Jun. 5, 2006.

(51) Int. Cl.
*G06K 9/00* (2006.01)
*G06K 9/40* (2006.01)

(52) U.S. Cl. .................. 382/168; 382/167; 382/254; 382/274

(58) Field of Classification Search .............. 382/168, 382/167, 254, 274
See application file for complete search history.

(56) References Cited

U.S. PATENT DOCUMENTS

| 6,181,321 | B1 * | 1/2001 | Zhao et al. ............ 345/617 |
| 6,718,056 | B1 * | 4/2004 | Bothorel et al. ........ 382/132 |
| 7,006,688 | B2 * | 2/2006 | Zaklika et al. .......... 382/165 |
| 2002/0079457 | A1 * | 6/2002 | Nakazawa ............ 250/370.09 |

OTHER PUBLICATIONS

Dellenback, P.—"Contrast-enhancement techniques for particle-image velocimetry"—Applied Optics—vol. 39, No. 32, Nov. 2000.*

* cited by examiner

*Primary Examiner*—Bhavesh M Mehta
*Assistant Examiner*—Bernard Krasnic
(74) *Attorney, Agent, or Firm*—Mima Abyad; Wade J. Brady, III; Frederick H. Telecky, Jr.

(57) ABSTRACT

Digital camera contrast enhancement with piecewise-linear transform with lower and upper cutoffs for the transform determined from histogram analysis with a green color conversion approximation for images and IIR parameter filtering for videos.

3 Claims, 7 Drawing Sheets

DIGITAL CAMERA AND METHOD

CROSS-REFERENCE TO RELATED APPLICATIONS

This application claims priority from provisional patent application Nos. 60/747,033, filed May 11, 2006 and 60/803,904, filed Jun. 5, 2006. The following copending co-assigned patent applications disclose related subject matter: application Nos.: [TI-63272,63275]

BACKGROUND OF THE INVENTION

The present invention relates to digital signal processing, and more particularly to architectures and methods for enhancement in digital images and video.

Imaging and video capabilities have become the trend in consumer electronics. Digital cameras, digital camcorders, and video cellular phones are common, and many other new gadgets are evolving in the marketplace. Advances in large resolution CCD/CMOS sensors coupled with the availability of low-power digital signal processors (DSPs) has led to the development of digital cameras with both high resolution still image and short audio/visual clip capabilities. The high resolution (e.g., sensor with a 2560×1920 pixel array) provides quality offered by traditional film cameras.

FIG. 2a is an example functional block diagram for digital camera control and image processing ("image pipeline"). The automatic focus, automatic exposure, and automatic white balancing are referred to as the 3A functions; and the image processing includes functions such as color filter array (CFA) interpolation, gamma correction, white balancing, color space conversion, and JPEG/MPEG compression/decompression (JPEG for single images and MPEG for video clips). Note that the typical color CCD consists of a rectangular array of photosites (corresponding to pixels in an output image) with each photosite covered by a filter (the CFA): typically, red, green, or blue. In the commonly-used Bayer pattern CFA one-half of the photosites are green, one-quarter are red, and one-quarter are blue. FIGS. 2b-2d show an alternative architecture with FIG. 2c illustrating the video frontend of the FIG. 2b processor, and FIG. 2d the preview engine (PRV) of the processor.

Typical digital cameras provide a capture mode with full resolution image or audio/visual clip processing plus compression and storage, a preview mode with lower resolution processing for immediate display, and a playback mode for displaying stored images or audio/visual clips.

High contrast images are appealing to human eyes. However, it is difficult to obtain high contrast images from video or still cameras or camera phones, due to the limitations of the sensors, image processors, and displays. Many contrast enhancement methods have been proposed for image processing applications. But they are either too complex to be used for consumer video or still cameras, or specific for different imaging applications such as biomedical imaging. A desirable method for digital cameras should be universal, because digital cameras will be used to capture different kinds of images. It also should have low computation complexity and low memory requirements, due to the cost and shot-to-shot constraints of digital cameras.

Starck et al., "Gray and Color Image Contrast Enhancement by the Curvelet Transform", 12 IEEE Trans. Image Processing, 706 (June 2003) discloses a complex transform on images, resulting in high computational complexity and high memory requirements.

SUMMARY OF THE INVENTION

The present invention provides image and/or video contrast enhancement with low complexity by piecewise-linear transform with saturation values determined by histogram analysis.

DESCRIPTION OF THE PREFERRED EMBODIMENTS

1. Overview

Figure 1A:
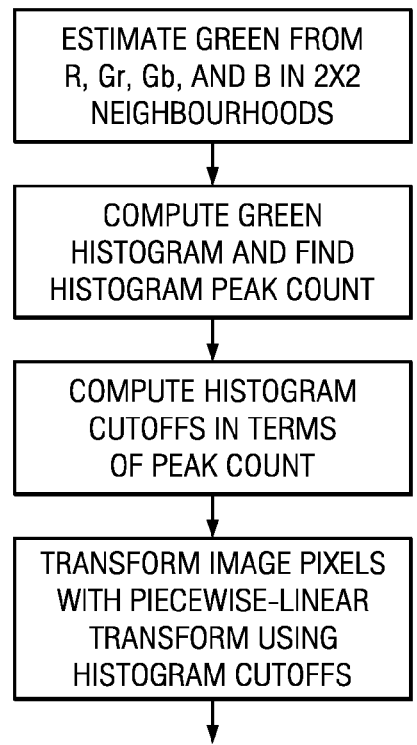
FIGS. 1a-1d are a flowchart plus enhancement function graphs and a heuristic histogram.

Preferred embodiment image (still image or individual video frame) contrast enhancement methods apply a piecewise-linear transform with the transform cutoffs determined as a fraction of the peak histogram count for an estimated green component; see FIG. 1a. The enhancement typically would precede gamma correction in the image pipeline. Video preferred embodiment methods include parameter filtering for smooth contrast enhancements from frame to frame and the use of prior frame statistics for one-pass enhancement.

Figure 2A:
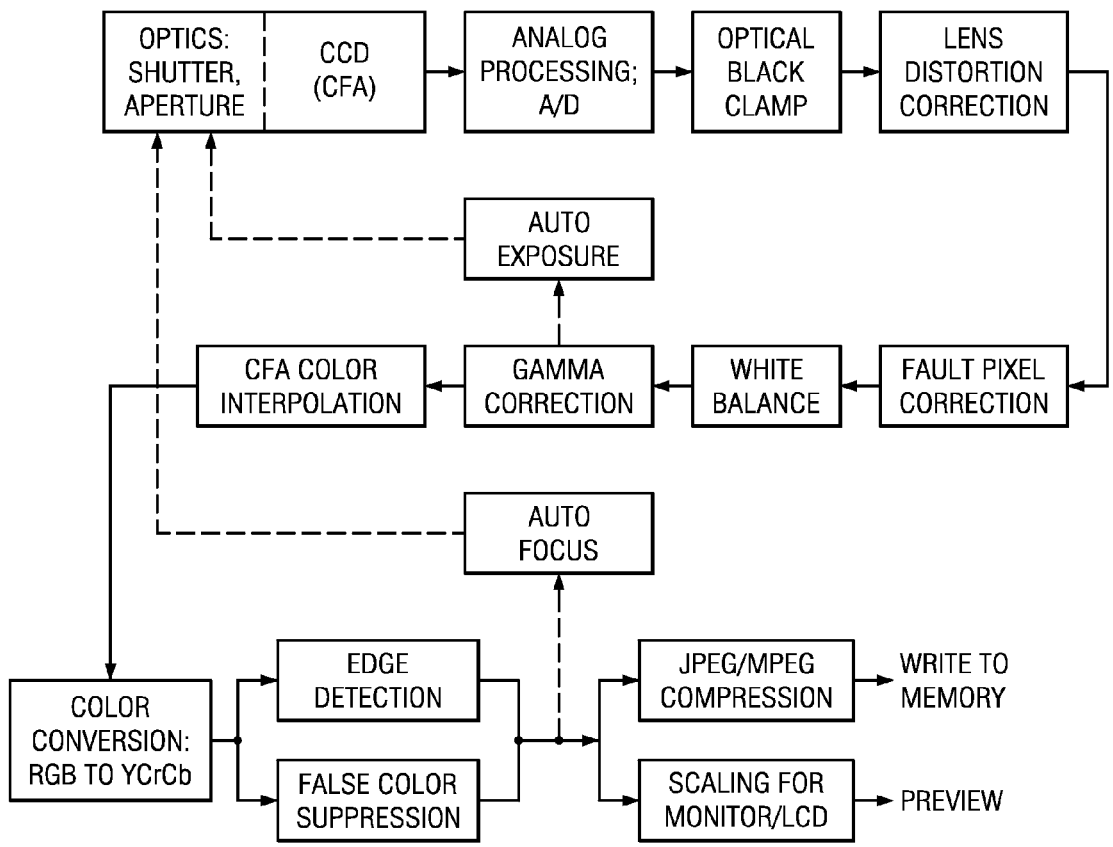
FIGS. 2a-2e illustrate an image pipeline, processor, and network communication.
Figure 2E:
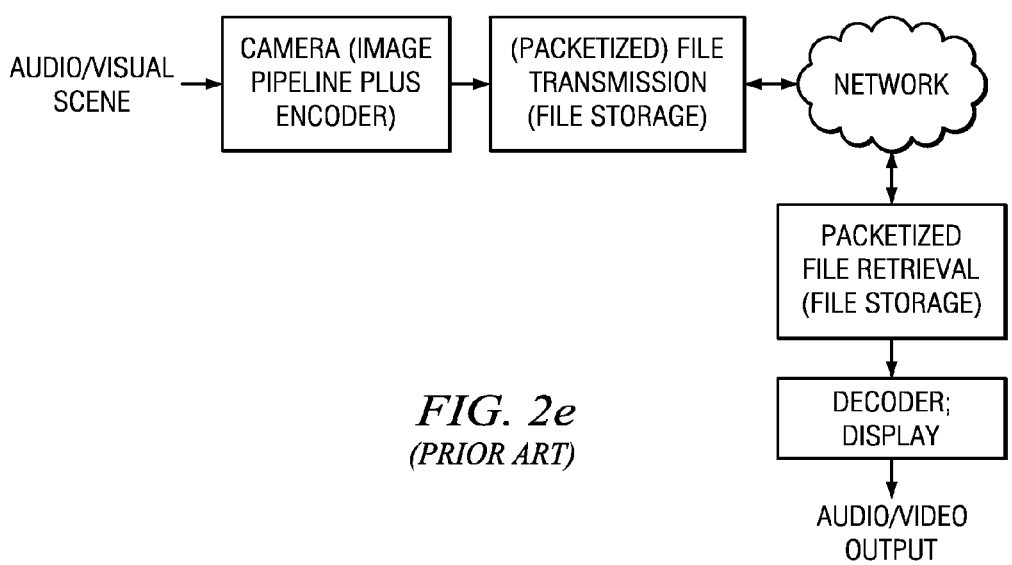
Figure 2B:
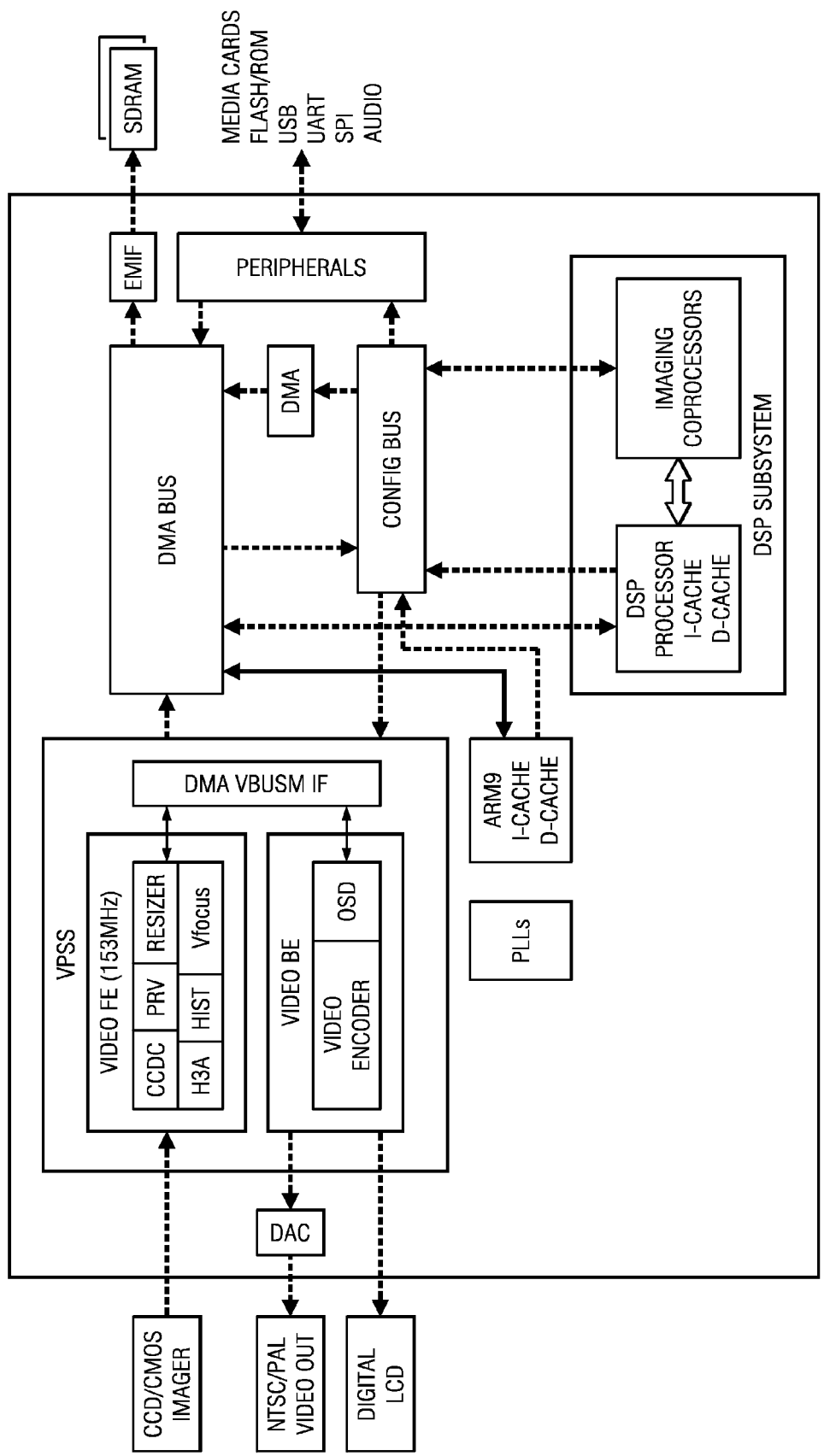
Figure 2C:
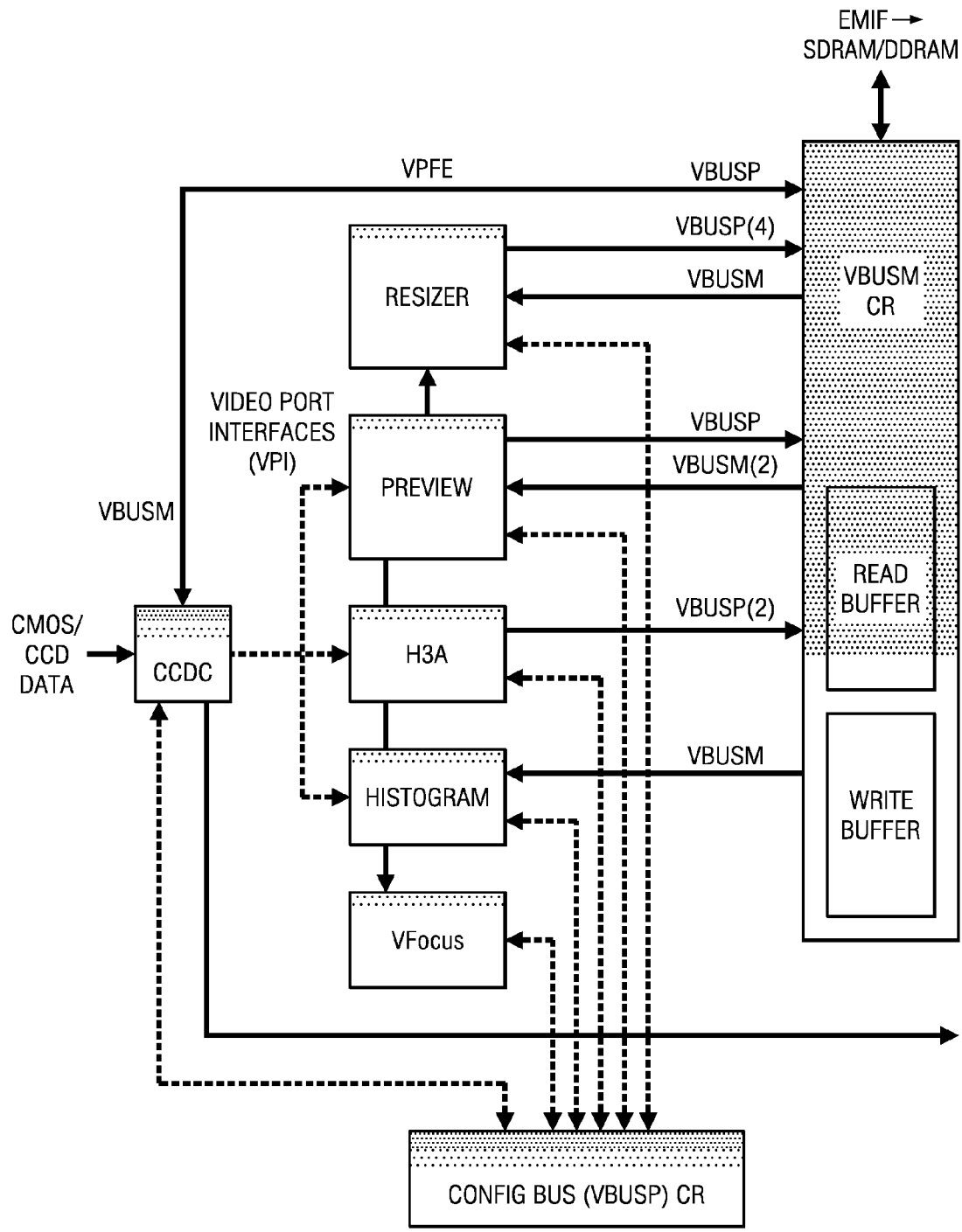

Preferred embodiment systems (camera cellphones, digital cameras, PDAs, etc.) perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 2b is an example of digital camera hardware. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 2e.

2. Image Contrast Enhancement

Figure 1B:
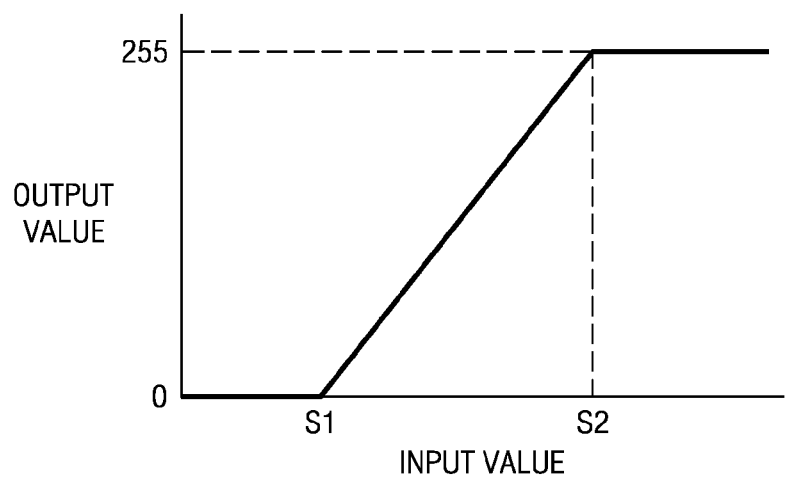
Figure 2D:
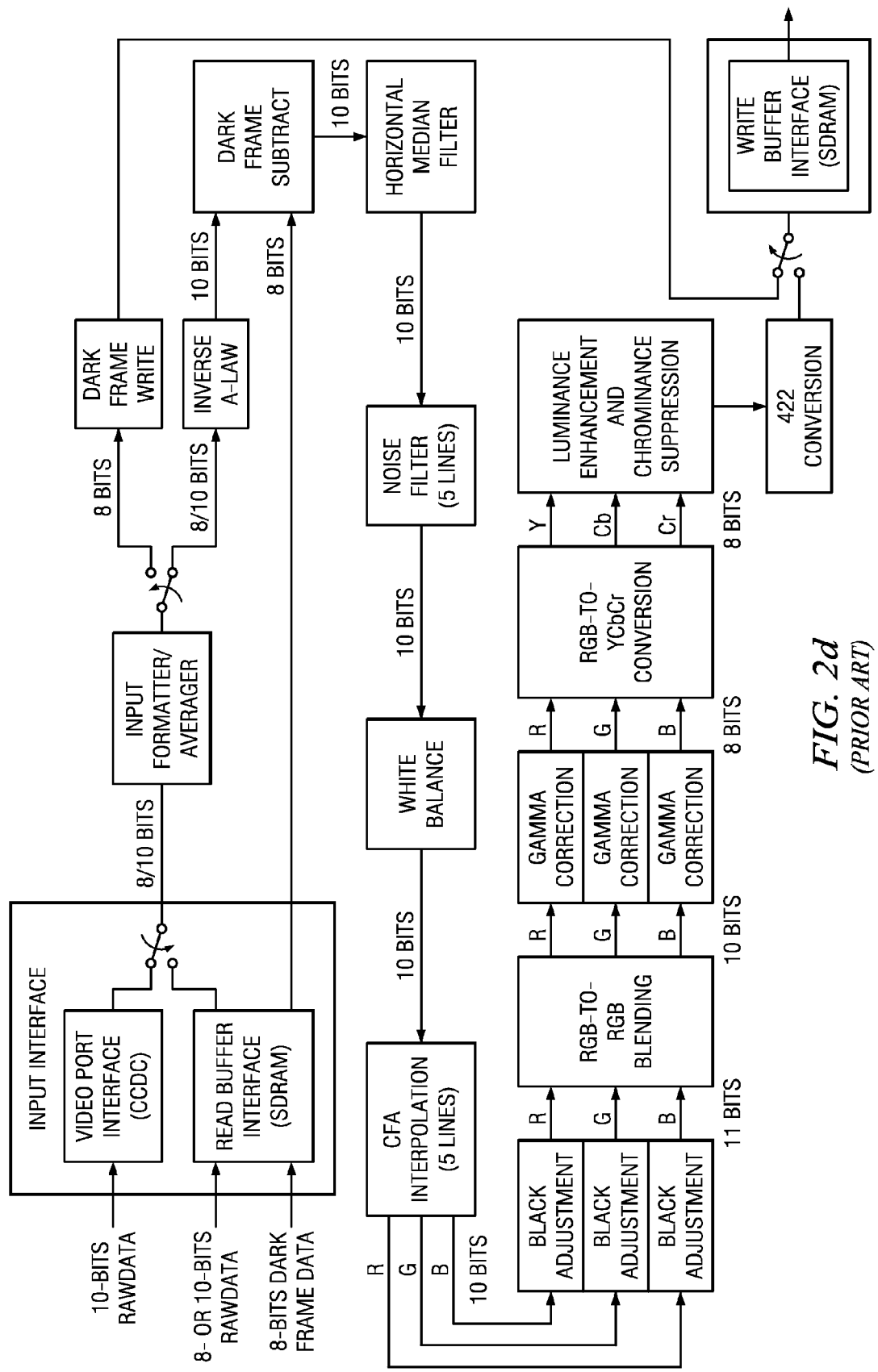

The first preferred embodiment contrast enhancement methods for images use a piecewise-linear transform of pixel values as shown in FIG. 1b; the scale in FIG. 1b corresponds to 8-bit (0-255) data. The piecewise-linear transform provides the advantage of linear transform simplicity for implementation. The linear transform is a constant mapping for the lower and higher values because human eyes are less sensitive to luminance variation in these two ranges than in the middle intensity range. This linear transform is performed before the gamma correction to take advantage of perceptual uniformity given by the gamma correction; that is, the contrast enhancement method inserted into the example of FIG. 2d could be applied between color conversion (RGB-to-RGB) and gamma correction. To achieve universal contrast enhancement, the two parameters, S1 and S2, of the transform would be image dependent. To keep color information consistent for an image, the same linear transform is applied independently to each of the R, G, and B components of each pixel.

The preferred embodiment image methods decide the cutoff points S1 and S2 in the linear transform function based upon the image characteristics. Luminance values are frequently used in contrast enhancement. Based on Rec709, the luminance level of each pixel is computed from the red, green, and blue component values as:

$$Y = 0.2125*R + 0.7154*G + 0.0721*B$$

Note that the green component contributes the most energy to the luminance. For low complexity, it is reasonable to use the green component only. Experiments also show that this simplification does not introduce any visual difference. Thus it would seem plausible to use the minimum and the maximum values of the green components of all pixels as the S1 and S2 values, respectively. However, this does not work well. First, for most images with appropriate exposure, the minimum and maximum pixel luminance or green values will be very close to 0 and 255, respectively. Second, the minimum and maximum values are usually determined by the outliners in an image.

The preferred embodiment image contrast enhancement methods use histogram analysis of an image to choose S1 and S2 as follows.

(a) Compute the histogram of the green component values for all pixels.

(b) Find the histogram peak, nP, which is the count of the most frequent green component value.

(c) Compute the cutoff number nC=nP*0.02.

(d) Find the value S1 as the smallest integer (in range 0 to 255) such that the number of pixels with green component value less than S1 is larger than nC.

(e) Find the value S2 as the largest integer (in the range 0 to 255) such that the number of the pixels with green component value greater than S2 is larger than nC.

Figure 1C:
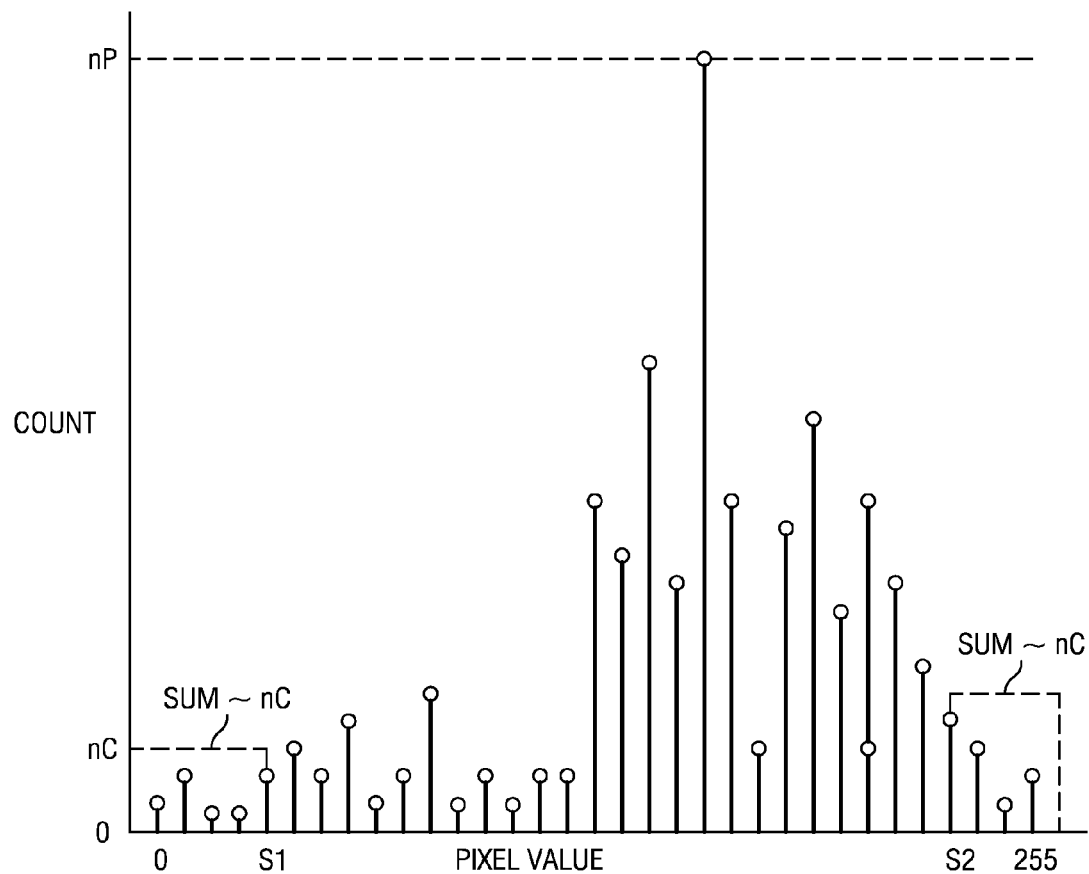

FIG. 1c heuristically illustrates a histogram with nP, nC, S1, and S2 labelled.

For example, with a 2560×1920 image there are 4,915,200 pixels and so the average count for each of the 256 possible green (or luminance) values is 19,200. Then with a peaky distribution of values, the maximum count, nP, may be very roughly about ten times the average; i.e., about 200,000. For this maximum count, the 2% cutoff, nC, would then be 4,000, which is about 20% of the overall average.

Alternative values for nC, such as 3% or 5% of nP, could be used limit noise at the extreme values or a small very dark or very bright area from determining S1 and S2. Indeed, lower values (e.g., 1%) or higher values (e.g., 9%) may also be useful. Similarly, the very dark and very bright pixels could be ignored by disregarding the extremes in the histogram, such as the counts for values in the range 0 to 5 and 250 to 255 would ignored in computing S1 and S2.

For higher resolution data, such as 12-bit green or luminance values, the number of possible values increases, e.g, to 4,096, but the histogram will have the same general shape, although more noisy looking, and the cutoff, nC, to determine S1 and S2 would still be computed as a fraction of the peak count, nP.

3. Low Complexity Contrast Enhancement

The main computational complexity of the foregoing methods lies in the histogram computation plus the linear transform computation. A straightforward way to do the histogram computation is after the RGB-to-RGB color level conversion.

$$\begin{bmatrix} R' \\ G' \\ B' \end{bmatrix} = \begin{bmatrix} M_{11} & M_{12} & M_{13} \\ M_{21} & M_{22} & M_{23} \\ M_{31} & M_{32} & M_{33} \end{bmatrix} \begin{bmatrix} R \\ G \\ B \end{bmatrix} + \begin{bmatrix} O_1 \\ O_2 \\ O_3 \end{bmatrix}$$

However, since an image is processed by all ISP functions row by row, two passes of ISP processing are required. There are two ways to lower complexity. One way computes the histogram using downsampled data from a preview engine; for example, the preview engine shown in FIG. 2d.

Another way is to perform the histogram computation before the ISP processing. The difficulty is how to estimate the histogram of processed green components based on Bayer raw data before processing. Note that after processing the processed green component is totally different from Gr and Gb components in the Bayer data. The first preferred embodiment methods use a simplified model for these processing. The first preferred embodiment methods estimate downsampled processed green components based on R, Gr, Gb, and B in a 2×2 neighbor of Bayer data by:

$$G = (W_R M_{2,1} R + W_G M_{2,2} G_r/2 + W_G M_{2,2} G_b/2 + W_B M_{2,3} B) D + O_2$$

where D is the digital gain, the $W_i$ are the white balancing gains, and $M_{2,i}$ and $O_2$ are the RGB-to-RGB conversion coefficients for the processed green component. That is, the contrast enhancement histogram uses these values of G.

4. Video Contrast Enhancement

Figure 1D:
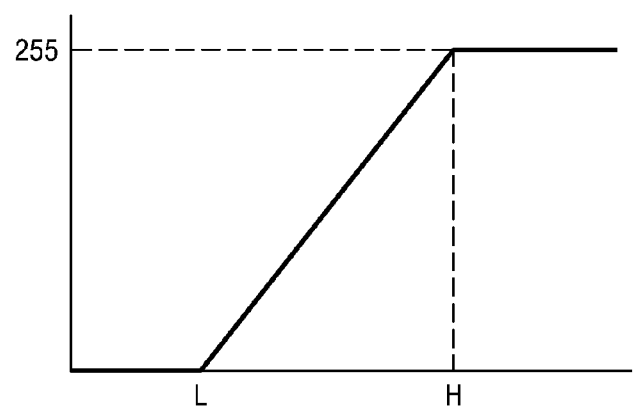

Analogous to the image contrast enhancement preferred embodiments, video contrast enhancement preferred embodiment methods use a piecewise linear transform for each video frame to enhance contrast. FIG. 1d is a graph of the piecewise linear function. As with the single image preferred embodiments, the main advantage of the linear transform is simplicity of implementation. The piecewise-linear transform is a constant mapping for the lower and higher values, because human eyes are less sensitive to luminance variation in these two ranges than in the middle range. For low complexity, this linear transform is performed on the luminance component Y directly, which does not change the color information. To achieve universal contrast enhancement, the two cutoff parameters, L and H, of the linear transform are image dependent. That is, the preferred embodiment methods must compute the cutoff values $\{L_n\}$ and $\{H_n\}$, where the subscript denotes the nth frame in a video sequence, based on the video characteristics.

It seems plausible to use the minimum and the maximum values of the luminance components of all pixels as L and H, respectively. However, it does not work well. First, for most videos with appropriate exposure, their minimum and maximum will be very close to 0 and 255, respectively. Second, the minimum and maximum values are usually determined by the outliners in the images.

Consequently, the preferred embodiment methods first analyze the histogram of each video frame as follows.

(1) Compute the histogram of the luminance components of the nth frame.

(2) Find the histogram peak, $P_n$, as the count of the most frequent luminance value.

(3) Compute the cutoff number, $C_n = P_n * 0.02$.

(4) Find the lower value $A_n$ such that the number of the pixels with luminance lower than $A_n$ is just larger than $C_n$.

(5) Find the upper value $B_n$ such that the number of the pixels with luminance higher than $B_n$ is just larger than $C_n$.

Then compute $L_n$ and $H_n$ for each video frame using a simple two-tap infinite impulse response (IIR) filter as follows. The purpose of this filtering is to smooth the contrast change between adjacent frames.

$$L_n = 0.75 * L_{n-1} + 0.25 * A_n$$

$$H_n = 0.75 * H_{n-1} + 0.25 * B_n$$

That is, perform the contrast enhancement in the following order:

(a) Compute the histogram of the values of the luminance components, $Y_{i,n}$, of the pixels of the nth frame.

(b) Update the parameters $L_n$ and $H_n$ by the IIR filtering using the $A_n$ and $B_n$ from the histogram of (1)-(5) above.

(c) Transform each luminance value in the nth frame by:

If $Y_{i,n} \leq L_n$, then $Y_{i,n}=0$;

If $L_n < Y_{i,n} < H_n$, then $Y_{i,n}=255*(Y_{i,n}-L_n)/(H_n L_n)$;

If $Y_{i,n} \geq H_n$, then $Y_{i,n}=255$.

Repeat (a)-(c) for successive frames.

Again, other multipliers for the cutoff could be used such as: $C_n=P_n*0.0\,m$ with m an integer in the range 1 to 9. Also, IIR filter coefficients other than 0.25 and 0.75 could be used for faster or slower adaptation. And when the color component values are in a range other than 0 to 255 (e.g, 12-bit colors with a range of 0 to 4095), then the contrast enhancement transformation would adjust accordingly: $Y_{i,n}=\min+(\max-\min)*(Y_{i,n}-L_n)/(H_n-L_n)$, $Y_{i,n}=\max$, or $Y_{i,n}=\min$, where max and min are the maximum and minimum, respectively, of the component value range.

5. Low Complexity Video Contrast Enhancement

The preceding video contrast enhancement implementation needs to go through luminance components in two passes (accumulating the histogram and performing the piecewise-linear transform). Some system may require a one-pass solution. In that case, we will use the parameters computed from a previous frame for the current frame. Specifically, we perform the video contrast enhancement in the following single-pass order:

(1) For first/next pixel luminance value, accumulate it in a histogram array $\text{Hist}_n[Y_{i,n}]=\text{Hist}_n[Y_{i,n}]+1$ (2) For first/next pixel luminance value, apply piecewise-linear transformation using the prior frame's cutoff parameters If $Y_{i,n} \leq L_{n-1}$, then $Y_{i,n}=0$;

If $L_{n-1} < Y_{i,n} < H_{n-1}$, then $Y_{i,n}=255*(Y_{i,n}-L_{n-1})/(H_{n-1}L_{n-1})$;

If $Y_{i,n} \geq H_{n-1}$, then $Y_{i,n}=255$.

(3) Repeat (1)-(2) for remaining pixels in nth frame (4) Update the parameters $L_n$ and $H_n$ based on the completed histogram $\text{Hist}_n$.

The main computation of the method is histogram computation and linear transform. Both of them have low complexity. Of course, analyzing the histogram of only every other (or less frequent) frame, and consequently updating $L_n$ and $H_n$ only every other (or less frequent) frame would further reduce computational complexity.

6. Experimental Results

Figure 3A:
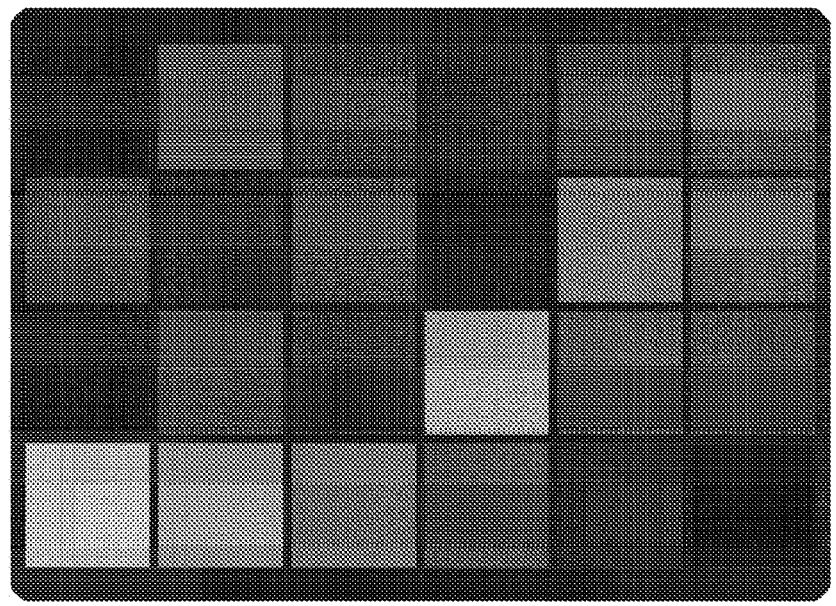
FIGS. 3a-3b show experimental results.
Figure 3B:
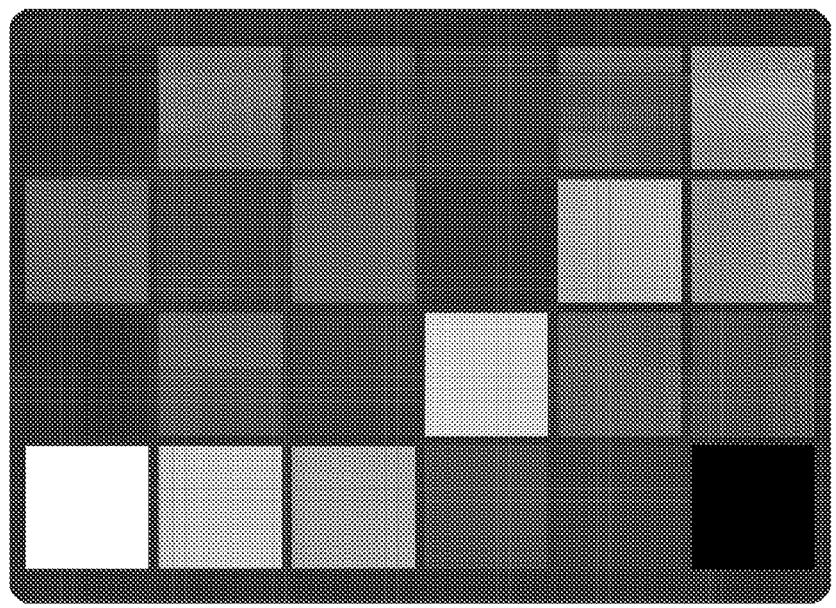

FIGS. 3a-3b show an example of preferred embodiment contrast enhancement. The FIG. 3a image is before contrast enhancement and the FIG. 3b image is after contrast enhancement method.

What is claimed is:

1. A video contrast enhancement method, comprising the steps of:
   (a) receiving an nth frame from an input video sequence;
   (b) computing a histogram of the values $Y_{i,n}$ where $Y_{i,n}$ denotes a component value of the ith pixel in the nth frame;
   (c) finding a histogram peak, $P_n$, as the count of the most frequent of said component values;
   (d) computing a cutoff number, $C_n=P_n*0.0\,m$ where m is an integer in the range 1 to 9;
   (e) finding $A_n$ as the smallest component value such that the number of the pixels in said nth frame with component value smaller than $A_n$ is larger than said $C_n$;
   (f) finding $B_n$ as the largest component value such that the number of the pixels in said nth frame with component value greater than $B_n$ is larger than said $C_n$;
   (g) computing $L_n$ and $H_n$ as $L_n=0.75*L_{n-1}+0.25*A_n$ and $H_n=0.75*H_{n-1}+0.25*B_n$ where $L_{n-1}$ and $H_{n-1}$ are from a prior (n−1)st frame;
   (h) transforming said component values in said nth frame by:
      (1) when $Y_{i,n} \leq L_n$, then $Y_{i,n}=\min$, where min is a minimal value for said component;
      (2) when $Y_{i,n} \geq H_n$, then $Y_{i,n}=\max$, where max is a maximum value for said component; and
      (3) when $L_n < Y_{i,n} < H_n$, then $Y_{i,n}=\min+(\max-\min)*(Y_{i,n}-L_n)/(H_n-L_n)$; and
   (i) repeating (a)-(h) for further frames with n replaced by n+1, n+2, . . . .

2. The method of claim 1, wherein said component is a luminance component and said max=255 and said min=0.

3. The method of claim 1, wherein said component is a green component.

* * * * *